(12) United States Patent
Hasegawa et al.

(10) Patent No.: US 11,435,109 B2
(45) Date of Patent: Sep. 6, 2022

(54) VENTILATOR

(71) Applicant: Mitsubishi Electric Corporation, Tokyo (JP)

(72) Inventors: Kohei Hasegawa, Tokyo (JP); Hajime Takashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 535 days.

(21) Appl. No.: 16/480,021

(22) PCT Filed: Mar. 24, 2017

(86) PCT No.: PCT/JP2017/012107
§ 371 (c)(1),
(2) Date: Jul. 23, 2019

(87) PCT Pub. No.: WO2018/173277
PCT Pub. Date: Sep. 27, 2018

(65) Prior Publication Data
US 2019/0368769 A1    Dec. 5, 2019

(51) Int. Cl.
*F24F 12/00* (2006.01)
*F24F 13/10* (2006.01)

(52) U.S. Cl.
CPC ............ *F24F 12/006* (2013.01); *F24F 13/10* (2013.01)

(58) Field of Classification Search
CPC .......... F24F 12/006; F24F 13/10; F24F 13/20; Y02B 30/56; F28D 9/0093
(Continued)

(56) References Cited

U.S. PATENT DOCUMENTS 5,490,557 A * 2/1996 Taylor .................. F24F 12/006
165/77
6,889,750 B2 * 5/2005 Lagace .................. F24F 11/30
165/4
(Continued)

FOREIGN PATENT DOCUMENTS

JP    S58179745 A    10/1983
JP    S58179746 A    10/1983
(Continued)

OTHER PUBLICATIONS

Office Action dated Mar. 9, 2021, issued in corresponding Japanese Patent Application No. JP 2019-506905, 7 pages including 4 pages of English translation.
(Continued)

*Primary Examiner* — Jon T. Schermerhorn, Jr.
(74) *Attorney, Agent, or Firm* — Buchanan Ingersoll & Rooney PC

(57) ABSTRACT

A ventilator includes a heat exchanger including a plurality of layered partition members, and a housing that has a first end wall part covering one end side of the heat exchanger along a layering direction and a second end wall part covering the other end side of the heat exchanger, and partitions a periphery of the heat exchanger into an exhaust air flow inlet space, an exhaust air flow outlet space, a supply air flow inlet space, and a supply air flow outlet space. An exhaust air flow passes through the exhaust air flow outlet space during heat exchange ventilation, and passes through the supply air flow inlet space during normal ventilation. A supply air flow passes through the supply air flow inlet space during heat exchange ventilation, and passes through the exhaust air flow outlet space during normal ventilation.

16 Claims, 15 Drawing Sheets

(58) Field of Classification Search
USPC .......................................................... 165/96
See application file for complete search history.

(56) References Cited

U.S. PATENT DOCUMENTS

| | | | | |
|---|---|---|---|---|
| 11,187,429 | B2* | 11/2021 | Puttagunta | F24F 12/006 |
| 2007/0158049 | A1* | 7/2007 | Kim | F24F 12/006 |
| | | | | 165/50 |
| 2007/0214810 | A1* | 9/2007 | Yabu | F24F 13/20 |
| | | | | 62/93 |
| 2010/0122794 | A1* | 5/2010 | Mooij | F28D 9/0037 |
| | | | | 165/67 |
| 2010/0170655 | A1* | 7/2010 | Kronvall | F24D 5/12 |
| | | | | 165/104.34 |
| 2014/0260362 | A1* | 9/2014 | Jung | F28D 9/0031 |
| | | | | 165/135 |
| 2017/0045257 | A1* | 2/2017 | Moffitt | F28D 9/0093 |
| 2019/0128556 | A1* | 5/2019 | Grinbergs | F24F 12/006 |

FOREIGN PATENT DOCUMENTS

| | | |
|---|---|---|
| JP | 3438280 B2 | 8/2003 |
| WO | 2005036069 A1 | 4/2005 |

OTHER PUBLICATIONS

Japanese Office Action dated Feb. 18, 2020 issued in Japanese Patent Application No. 2019-506905, with English translation (8 pages).

Office Action dated May 7, 2020, issued in corresponding Japanese Patent Application No. 2019-506905, 9 pages including 5 pages of English translation.

International Search Report (PCT/ISA/210) with translation, and Written Opinion (PCT/ISA/237) dated May 30, 2017, by the Japan Patent Office as the International Searching Authority for International Application No. PCT/JP2017/012107.

Office Action dated Sep. 1, 2020, issued in corresponding Japanese Patent Application No. 2019-506905, 5 pages including 3 pages of English translation.

* cited by examiner

VENTILATOR

FIELD

The present invention relates to a ventilator that performs ventilation while carrying out heat exchange between a supply air flow and an exhaust air flow.

BACKGROUND

For ventilation of an air-conditioned room, a heat recovery ventilator including a heat exchanger for heat recovery may be used for recovery of energy used for air conditioning. A heat recovery ventilator includes a supply air passage through which a supply air flow for supplying outdoor air into a room passes, an exhaust air passage through which an exhaust air flow for exhausting indoor air to the outside passes, and a heat exchanger through which the supply air flow and the exhaust air flow pass and which carries out heat exchange between the supply air flow and the exhaust air flow. In addition, as taught in Patent Literature 1, some ventilators further include a normal air passage that is a non-heat-exchanging air passage bypassing the heat exchanger, and can perform ventilation in either of a normal ventilation mode in which heat exchange is not carried out and a heat exchange ventilation mode in which heat exchange is carried out by switching using a switching unit that opens and closes the normal air passage.

CITATION LIST

Patent Literature

Patent Literature 1: Japanese Patent No. 3438280

SUMMARY

Technical Problem

Some ventilators that include a normal air passage include only either one of a normal air passage as a bypass for the supply air flow and a normal air passage as a bypass for the exhaust air flow. In such a ventilator, during normal ventilation, an air current that passes through an air passage that is not bypassed even though heat exchange is not carried out passes through the heat exchanger. Thus, pressure loss becomes large in the air passage in which an air current passes through the heat exchanger, which increases the size of a fan for ensuring a sufficient amount of air. This results in increase in power consumption and increase in noise.

In addition, some ventilators include both a normal air passage as a bypass for the supply air flow and a normal air passage as a bypass for the exhaust air flow, which have a problem in that the system is increased in size because a number of normal air passages are provided.

The present invention have been made in view of the above, and an object thereof is to provide a ventilator capable of reducing pressure loss during normal ventilation and suppressing noise during normal ventilation while preventing increase in size of products.

Solution to Problem

To solve the aforementioned problems and achieve the object, a ventilator according to the present invention includes: a heat exchanger including a plurality of layered partition members, and having an exhaust air flow inlet face that faces a direction perpendicular to a layering direction of the partition members and through which an exhaust air flow enters, an exhaust air flow outlet face that faces a direction perpendicular to the layering direction of the partition members and through which the exhaust air flow exits, a supply air flow inlet face that faces a direction perpendicular to the layering direction of the partition members and through which a supply air flow enters, and a supply air flow outlet face that faces a direction perpendicular to the layering direction of the partition members and through which the supply air flow exits; and a housing accommodating the heat exchanger therein, and including a first end wall part covering a first end side of the heat exchanger along the layering direction, and a second end wall part covering a second end side of the heat exchanger along the layering direction. The inside of the housing is partitioned into an exhaust air flow inlet space to which the exhaust air flow inlet face is exposed, an exhaust air flow outlet space to which the exhaust air flow outlet face is exposed, a supply air flow inlet space to which the supply air flow inlet face is exposed, and a supply air flow outlet space to which the supply air flow outlet face is exposed. The first end wall part has a first opening communicating with the exhaust air flow inlet space, a second opening communicating with the exhaust air flow outlet space, a third opening communicating with the supply air flow inlet space, and a fourth opening communicating with the supply air flow outlet space. The housing has a fifth opening communicating with the exhaust air flow outlet space, and a sixth opening communicating with the supply air flow inlet space. The ventilator further includes: a first damper that selectively closes either one of the first opening and the third opening, and a second damper that selectively closes either one of the second opening and the fourth opening.

Advantageous Effects of Invention

A ventilator according to the present invention produces advantageous effects of reducing pressure loss during normal ventilation and suppressing noise during normal ventilation while preventing increase in size of products.

DESCRIPTION OF EMBODIMENTS

A ventilator according to certain embodiments of the present invention will be described in detail below with reference to the drawings. Note that the present invention is not limited to the embodiments.

First Embodiment

Figure 1:
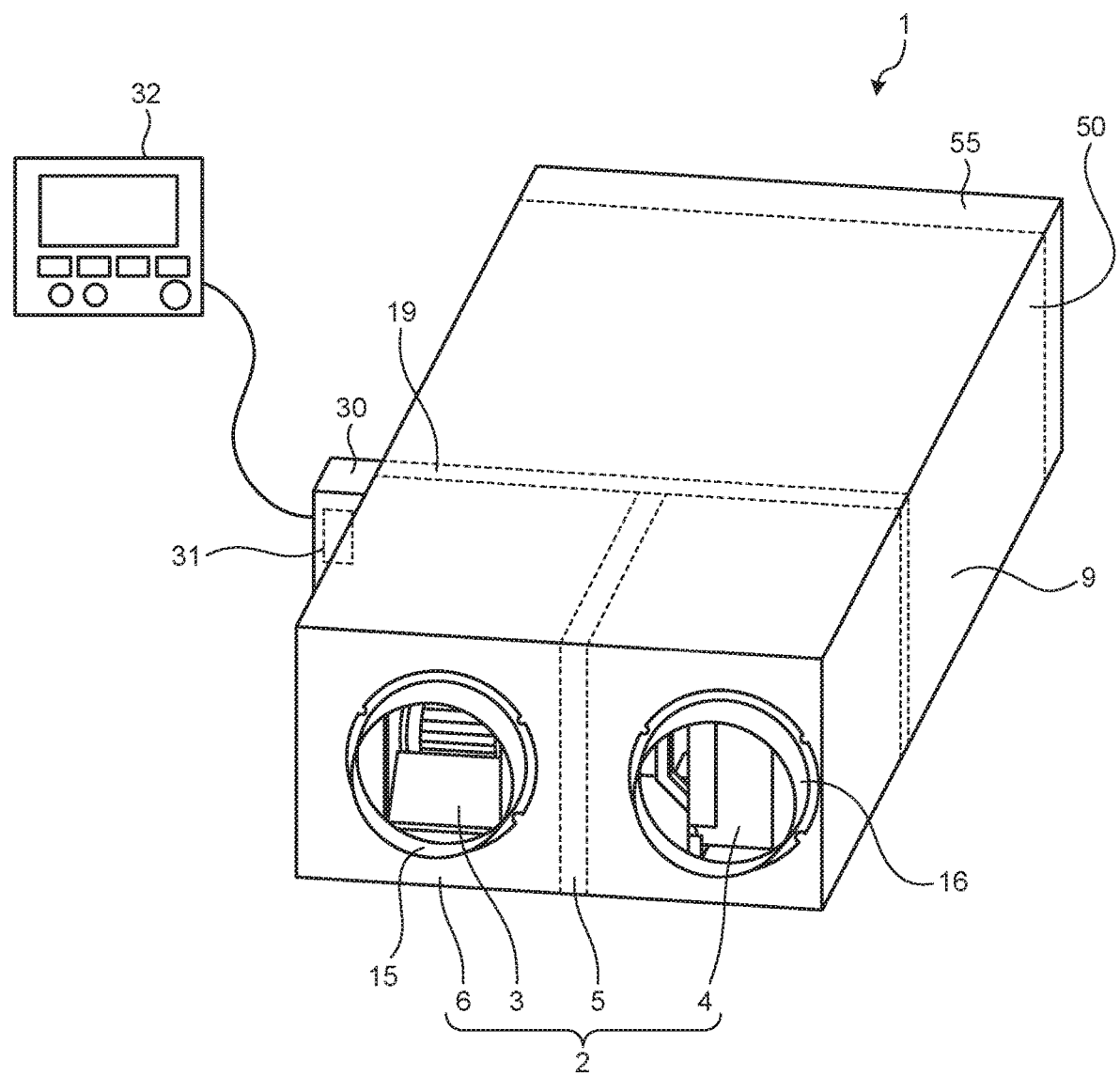
FIG. 1 is a perspective view of a ventilator according to a first embodiment of the present invention.
Figure 2:
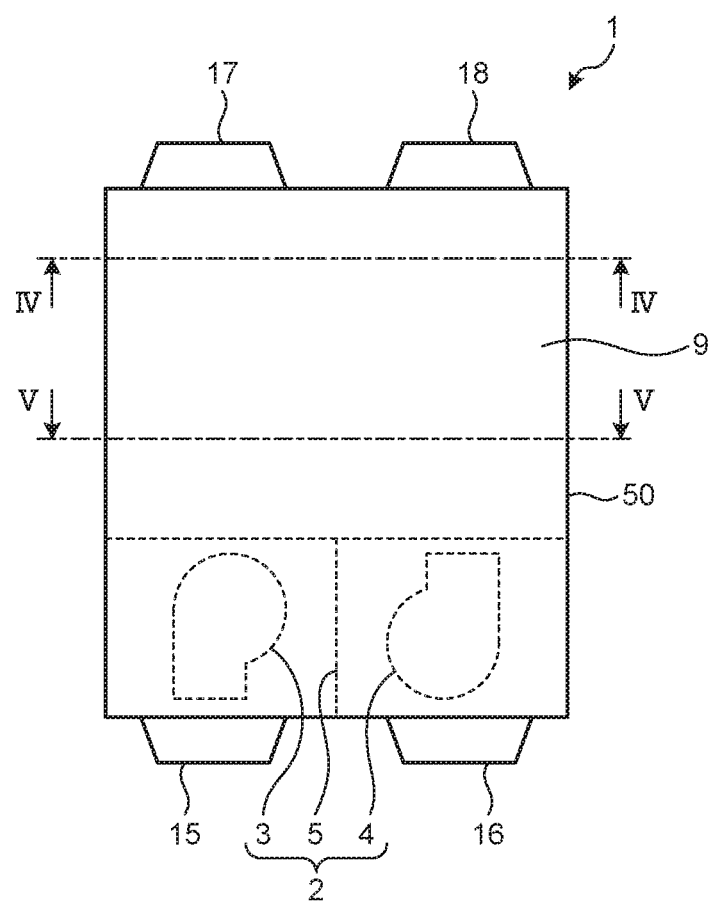
FIG. 2 is a plan view of the ventilator according to the first embodiment.
Figure 3:
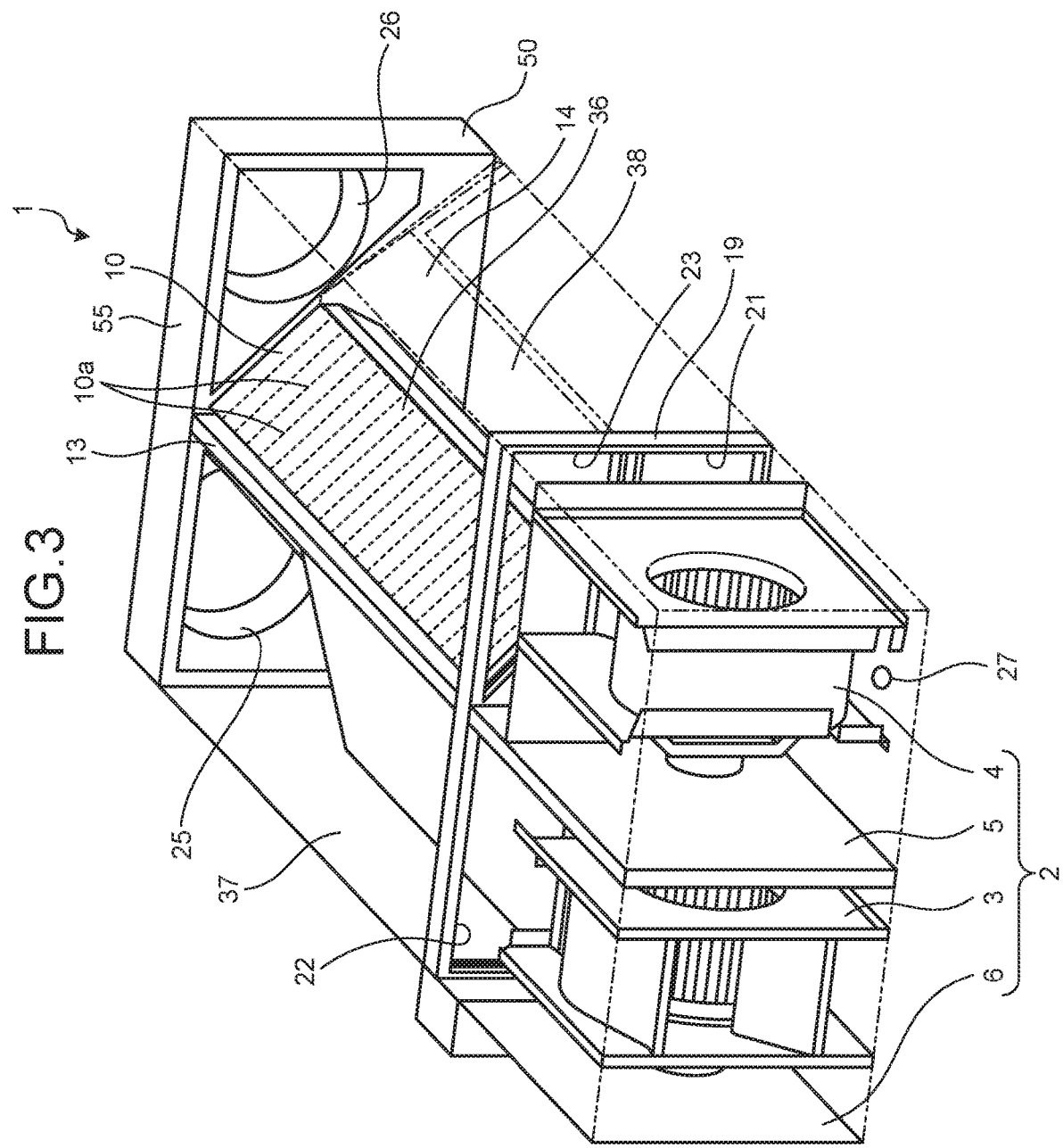
FIG. 3 is a perspective view illustrating an internal configuration of the ventilator according to the first embodiment.
Figure 4:
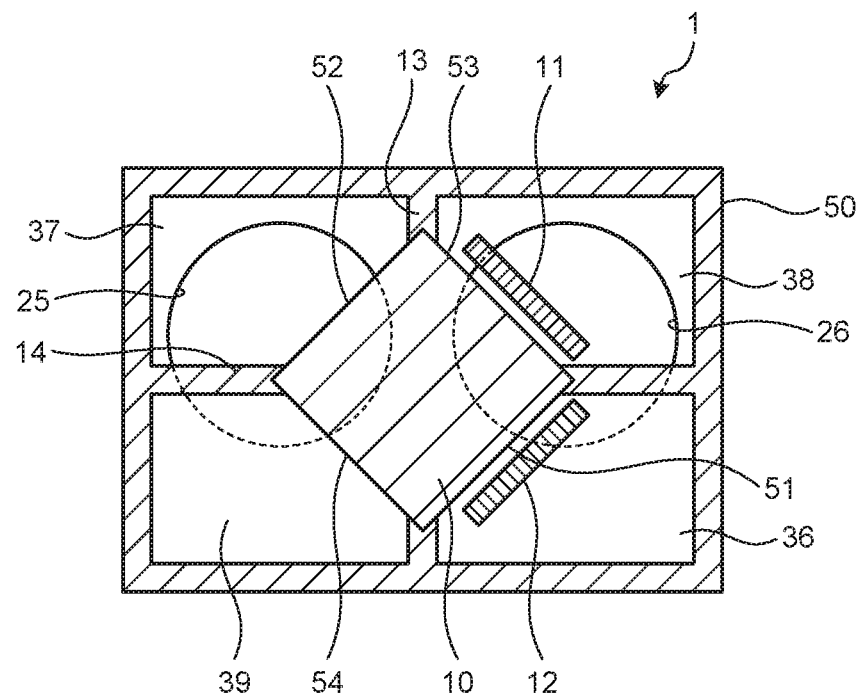
FIG. 4 is a cross-sectional view taken along line IV-IV illustrated in FIG. 2 as viewed in the direction of arrows.
Figure 5:
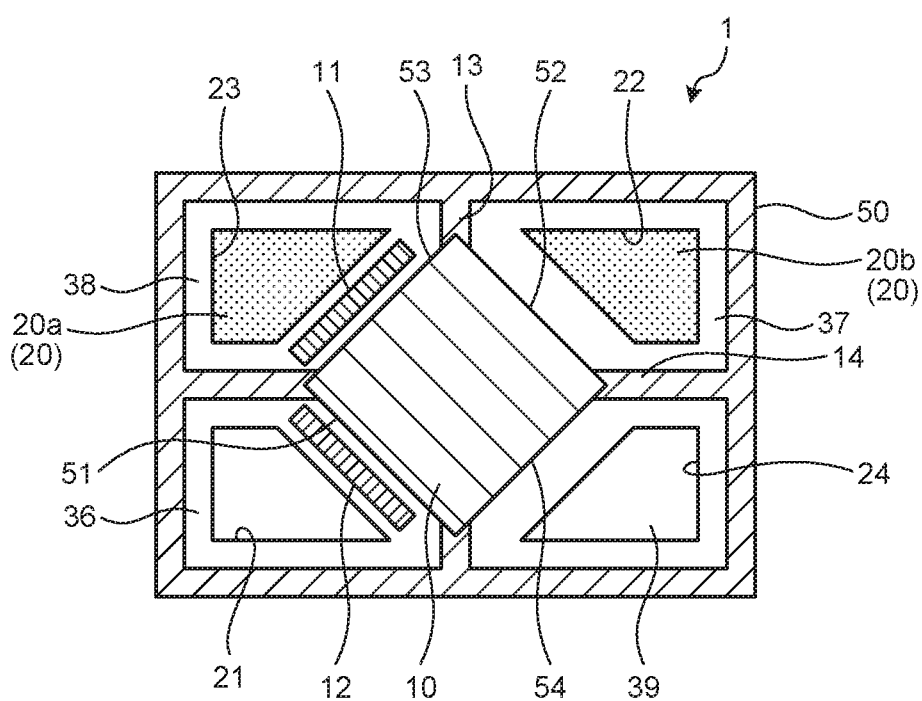
FIG. 5 is a cross-sectional view taken along line V-V in FIG. 2 as viewed in the direction of arrows.

FIG. 1 is a perspective view of a ventilator according to a first embodiment of the present invention. FIG. 2 is a plan view of the ventilator according to the first embodiment. FIG. 3 is a perspective view illustrating an internal configuration of the ventilator according to the first embodiment. FIG. 4 is a cross-sectional view taken along line IV-IV illustrated in FIG. 2 as viewed in the direction of arrows. FIG. 5 is a cross-sectional view taken along line V-V in FIG. 2 as viewed in the direction of arrows.

A ventilator 1 includes a housing 50 constituting an outer case, a heat exchanger 10, a supply fan 3, which is a second fan, and an exhaust fan 4, which is a first fan. The heat exchanger 10, the supply fan 3, and the exhaust fan 4 are accommodated inside the housing 50.

The supply fan 3 and the exhaust fan 4 are arranged next to each other. The supply fan 3 and the exhaust fan 4 are accommodated in a space surrounded by a fan part outer wall 6. The supply fan 3 and the exhaust fan 4 are separated from each other by a fan part air passage partition 5. The supply fan 3, the exhaust fan 4, and the fan part air passage partition 5 constitute a fan part 2. The fan part outer wall 6 and the fan part air passage partition 5 constitute part of the housing 50. As will be described later in detail, driving of the supply fan 3 produces, inside the housing 50, a supply air flow that is a flow of air from outside toward inside a room. In addition, driving of the exhaust fan 4 produces, inside the housing 50, an exhaust air flow that is a flow of air from inside toward outside a room. Note that the supply fan 3, when driven, sucks out air through a second opening 22 and a fourth opening 24, which will be described later. The exhaust fan 4, when driven, sends air into a first opening 21 and a third opening 23, which will be described later.

The heat exchanger 10 is constituted by a plurality of layered partition members 10a. The partition members 10a are spaced from each other by spacer members, which are not illustrated. The shape of the heat exchanger 10 is a quadrangular prism extending along the layering direction of the partition members 10a. Specifically, the heat exchanger 10 has four faces facing directions perpendicular to the layering direction. The four faces facing directions perpendicular to the layering direction of the heat exchanger 10 are classified as an exhaust air flow inlet face 51 through which an exhaust air flow enters, an exhaust air flow outlet face 52 through which an exhaust air flow exits, a supply air flow inlet face 53 through which a supply air flow enters, and a supply air flow outlet face 54 through which a supply air flow exits. The exhaust air flow inlet face 51 and the exhaust air flow outlet face 52 face directions opposite to each other, and the supply air flow inlet face 53 and the supply air flow outlet face 54 face directions opposite to each other. The exhaust air flow inlet face 51 is adjacent to the supply air flow inlet face 53 and the supply air flow outlet face 54. The exhaust air flow outlet face 52 is adjacent to the supply air flow inlet face 53 and the supply air flow outlet face 54. Note that, in the description below, the layering direction of the partition members 10a will be simply referred to as layering direction.

The housing 50 includes an air passage turning wall 19, which is a first end wall part covering one end side of the heat exchanger 10 along the layering direction, and a second end wall 55, which is a second end wall part covering the other end side of the heat exchanger 10 along the layering direction. The housing 50 includes a lateral partition member 13 and a vertical partition member 14 that partition the inside into an exhaust air flow inlet space 36 to which the exhaust air flow inlet face 51 is exposed, an exhaust air flow outlet space 37 to which the exhaust air flow outlet face 52 is exposed, a supply air flow inlet space 38 to which the supply air flow inlet face 53 is exposed, and a supply air flow outlet space 39 to which the supply air flow outlet face 54 is exposed. Specifically, the lateral partition member 13 and the vertical partition member 14 are arranged to be in contact with four corners of the heat exchanger 10, which are boundaries of the exhaust air flow inlet face 51, the exhaust air flow outlet face 52, the supply air flow inlet face 53, and the supply air flow outlet face 54. Part of the ventilator 1 accommodating the heat exchanger 10, that is, the exhaust air flow inlet space 36, the exhaust air flow outlet space 37, the supply air flow inlet space 38, the supply air flow outlet space 39, the air passage turning wall 19, and the second end wall 55 constitutes a heat exchanging part 9. The supply air flow inlet face 53 is provided with a supply filter 11, and the exhaust air flow inlet face 51 is provided with an exhaust filter 12, so as to protect the heat exchanger 10.

The air passage turning wall 19 has the first opening 21 communicating with the exhaust air flow inlet space 36, the second opening 22 communicating with the exhaust air flow outlet space 37, the third opening 23 communicating with the supply air flow inlet space 38, and the fourth opening 24 communicating with the supply air flow outlet space 39.

Figure 6:
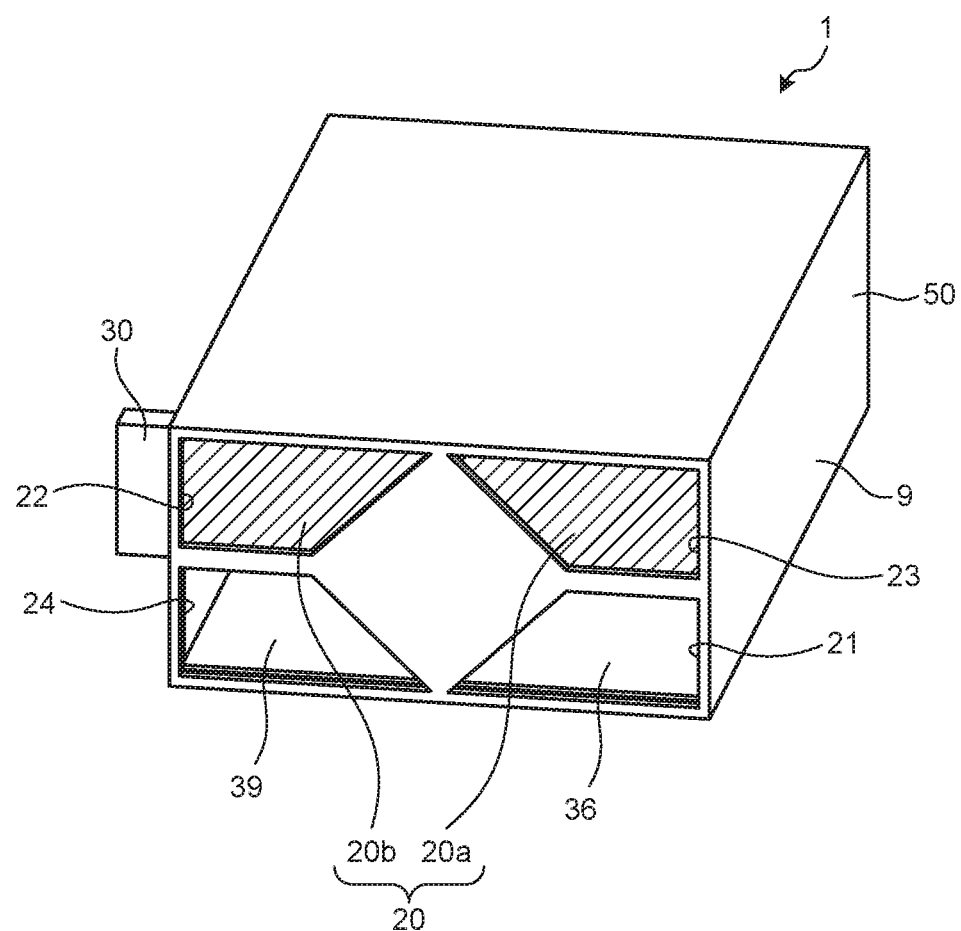
FIG. 6 is a perspective view of a heat exchanging part in the first embodiment, and illustrates a state in which a damper is located at an upper position.
Figure 7:
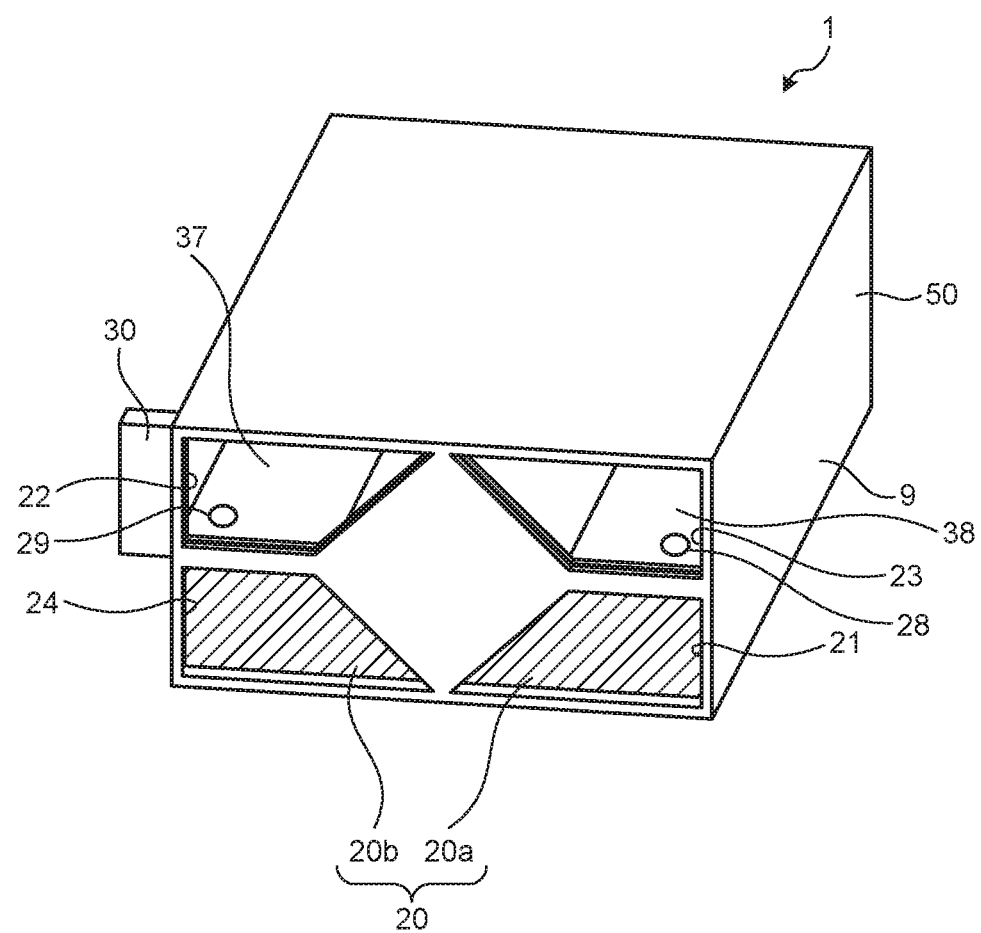
FIG. 7 is a perspective view of the heat exchanging part in the first embodiment, and illustrates a state in which the damper is located at a lower position.

FIG. 6 is a perspective view of the heat exchanging part 9 in the first embodiment, and illustrates a state in which a damper is located at an upper position. FIG. 7 is a perspective view of the heat exchanging part 9 in the first embodiment, and illustrates a state in which the damper is located at a lower position. In FIGS. 6 and 7, for easy understanding, the damper is hatched.

The air passage turning wall 19 includes a first damper 20a for selectively closing either of the first opening 21 and the third opening 23, and a second damper 20b for selectively closing either of the second opening 22 and the fourth opening 24. The first damper 20a and the second damper 20b may operate independently of each other, but the first damper 20a and second damper 20b in the first embodiment are integrated to constitute a damper 20. The damper 20 is vertically movable to switch between a state in which the first opening 21 and the fourth opening 24 are closed and a state in which the second opening 22 and the third opening 23 are closed. Although not illustrated, the second opening 22 is provided with a filter.

The second end wall 55 has a fifth opening 25 communicating with the exhaust air flow outlet space 37 and a sixth opening 26 communicating with the supply air flow inlet space 38. The fifth opening 25 and the sixth opening 26 form such a shape that introduces a circular air passage of a circular duct connected with the housing 50 into an air passage inside the housing 50 with no pressure loss. The vertical partition member 14 also has a shape having an inclined portion 14a on the side of an outdoor duct, so as to enable smooth connection with the second end wall 55. Note that the fifth opening 25 and the sixth opening 26 may be formed in a face different from the second end wall 55 among the outer faces of the housing 50.

The housing 50 is provided with a supply air (SA) duct guide 15, a return air (RA) duct guide 16, an outdoor duct guide 17, and an outdoor duct guide 18. The supply air duct guide 15, the return air duct guide 16, the outdoor duct guide 17 and the outdoor duct guide 18 are duct connecting parts attached to opening portions formed in the housing 50 and connected with ducts. The supply air duct guide 15, the return air duct guide 16, the outdoor duct guide 17, and the outdoor duct guide 18 are each connected with a duct, and outdoor air is supplied to the inside through the housing 50, and indoor air is exhausted to the outside through the housing 50.

To sum up the schematic configuration of the ventilator 1, the fan part 2, that is, the supply fan 3 and the exhaust fan 4 are provided on the side opposite to the heat exchanger 10 with respect to the air passage turning wall 19. In addition, the supply air duct guide 15 and the return air duct guide 16 are provided on parts of the fan part outer wall 6 facing the air passage turning wall 19.

Figure 8:
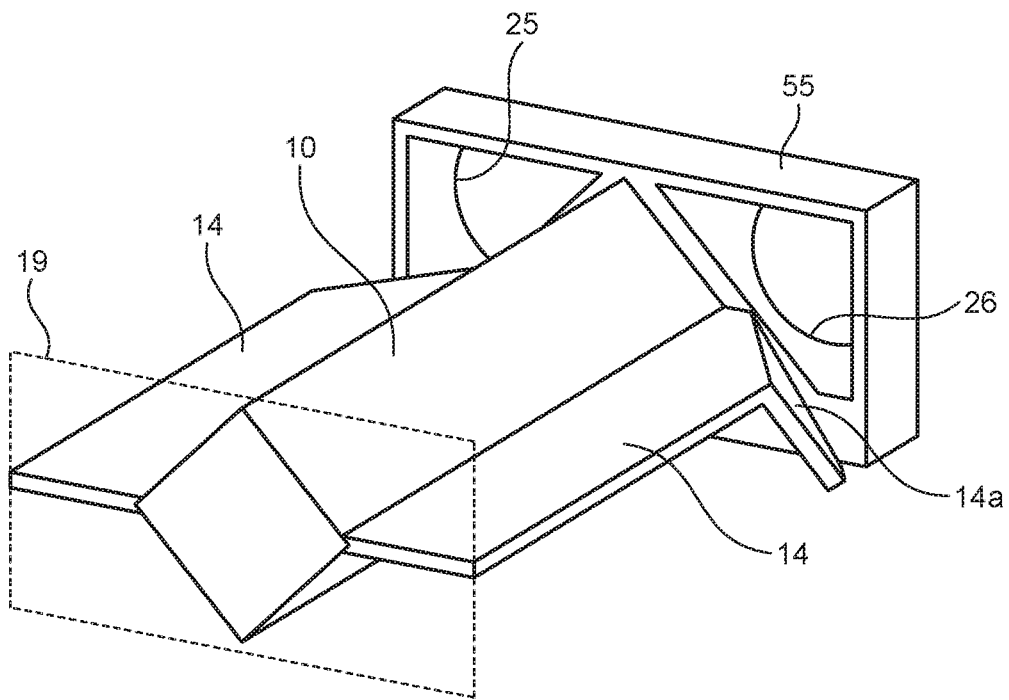
FIG. 8 is a perspective view illustrating a detailed structure of a vertical partition member in the first embodiment.
Figure 9:
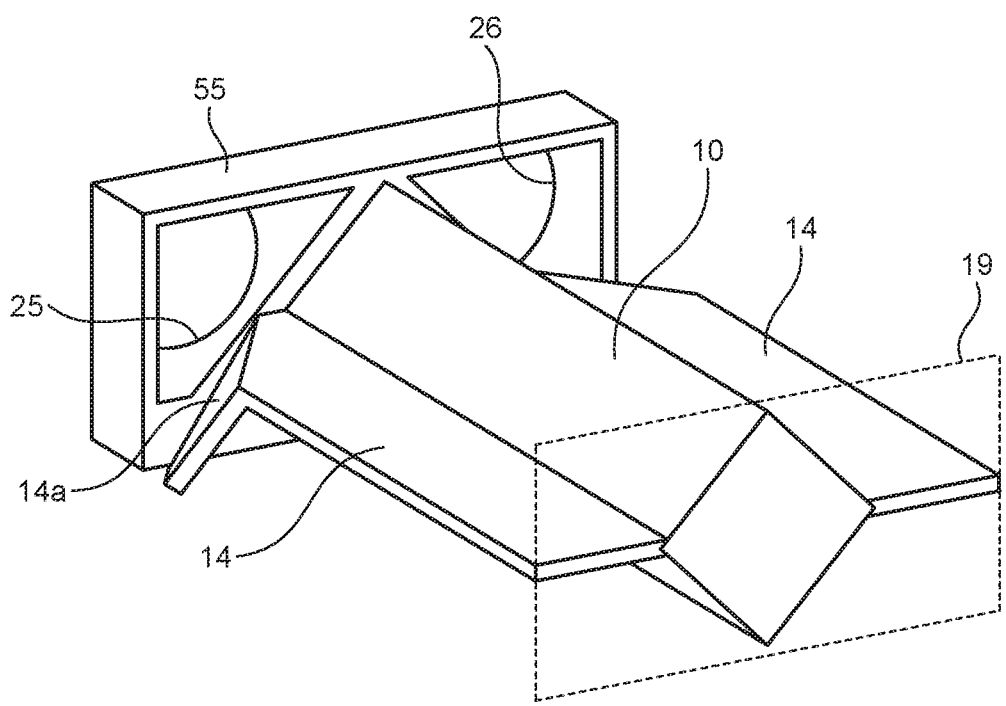
FIG. 9 is a perspective view illustrating a detailed structure of the vertical partition member in the first embodiment.

FIGS. 8 and 9 are perspective views illustrating a detailed structure of the vertical partition member 14 in the first embodiment. The vertical partition member 14 has a structure in which the shape of an end is deformed from the air passage turning wall 19 toward the second end wall 55, in such a manner that the area of an upper half region, among the periphery of the heat exchanger 10, leading to the outdoor ducts is large. The region of the vertical partition member 14 other than the certain region on the side of the second end wall 55, however, is kept in a flat shape.

The second end wall 55 has a structure with such a thickness that enables deformation from a circular shape for connecting a circular duct to a trapezoidal shape of the periphery of the heat exchanger 10 from an outdoor side end of the fifth opening 25 and an outdoor side end of the sixth opening 26 toward the inside of the housing 50.

The ventilator 1 includes an indoor temperature detecting thermistor 27 provided in a space in which the exhaust fan 4 of the fan part 2 is located. The indoor temperature detecting thermistor 27 detects indoor temperature. The indoor temperature detecting thermistor 27 is installed upstream of the exhaust fan 4 so as to avoid the influence of the exhaust heat temperature of a motor of the exhaust fan 4. The ventilator 1 includes an outdoor temperature detecting thermistor 28 for heat exchange ventilation installed in the supply air flow inlet space 38. The outdoor temperature detecting thermistor 28 for heat exchange ventilation detects outdoor temperature during heat exchange ventilation. The ventilator 1 includes an outdoor temperature detecting thermistor 29 for normal ventilation installed in the supply air flow outlet space 39. The outdoor temperature detecting thermistor 29 for normal ventilation detects outdoor temperature during normal ventilation.

Figure 10:
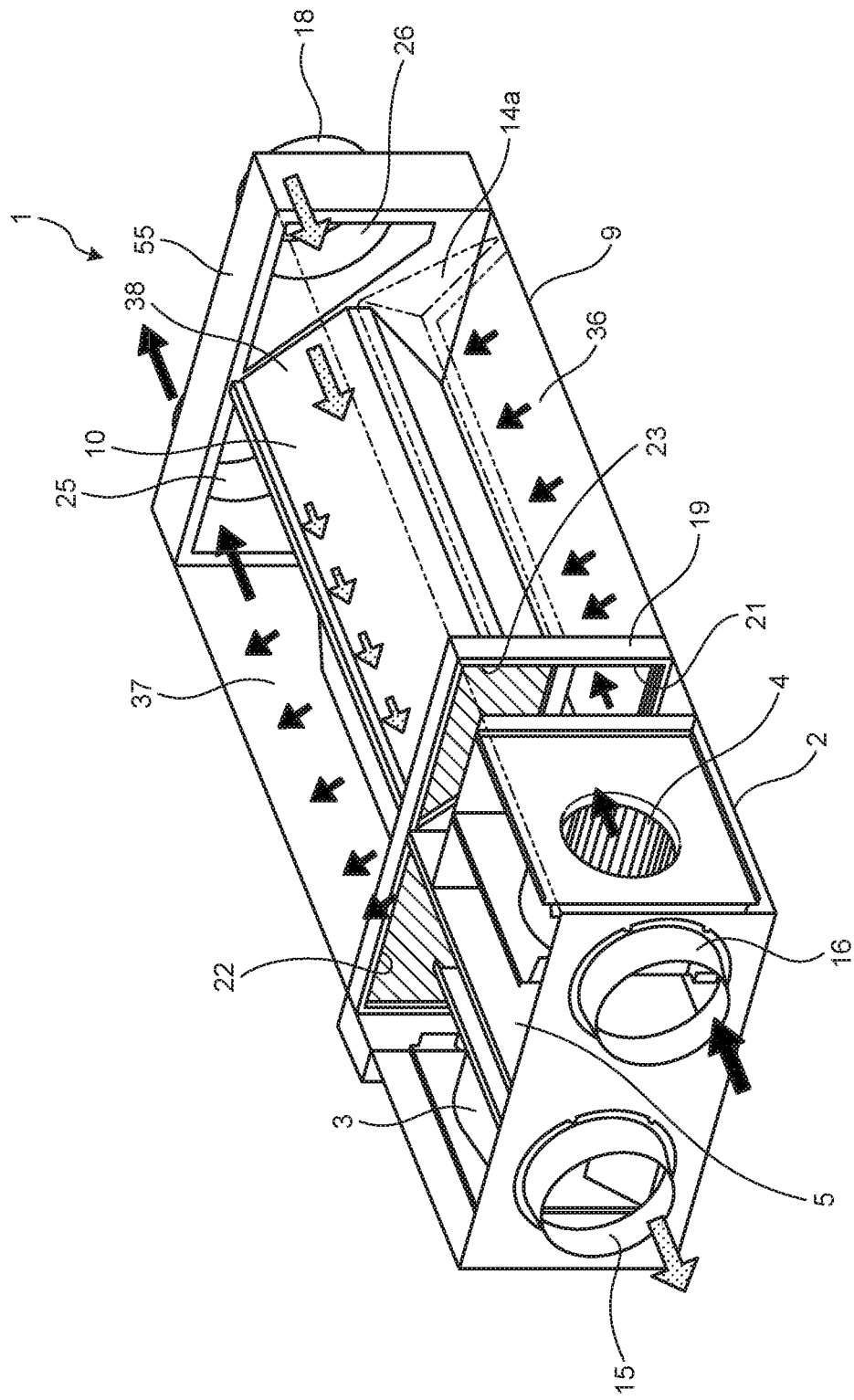
FIG. 10 is a perspective view illustrating a state in which the ventilator according to the first embodiment performs heat exchange ventilation.
Figure 11:
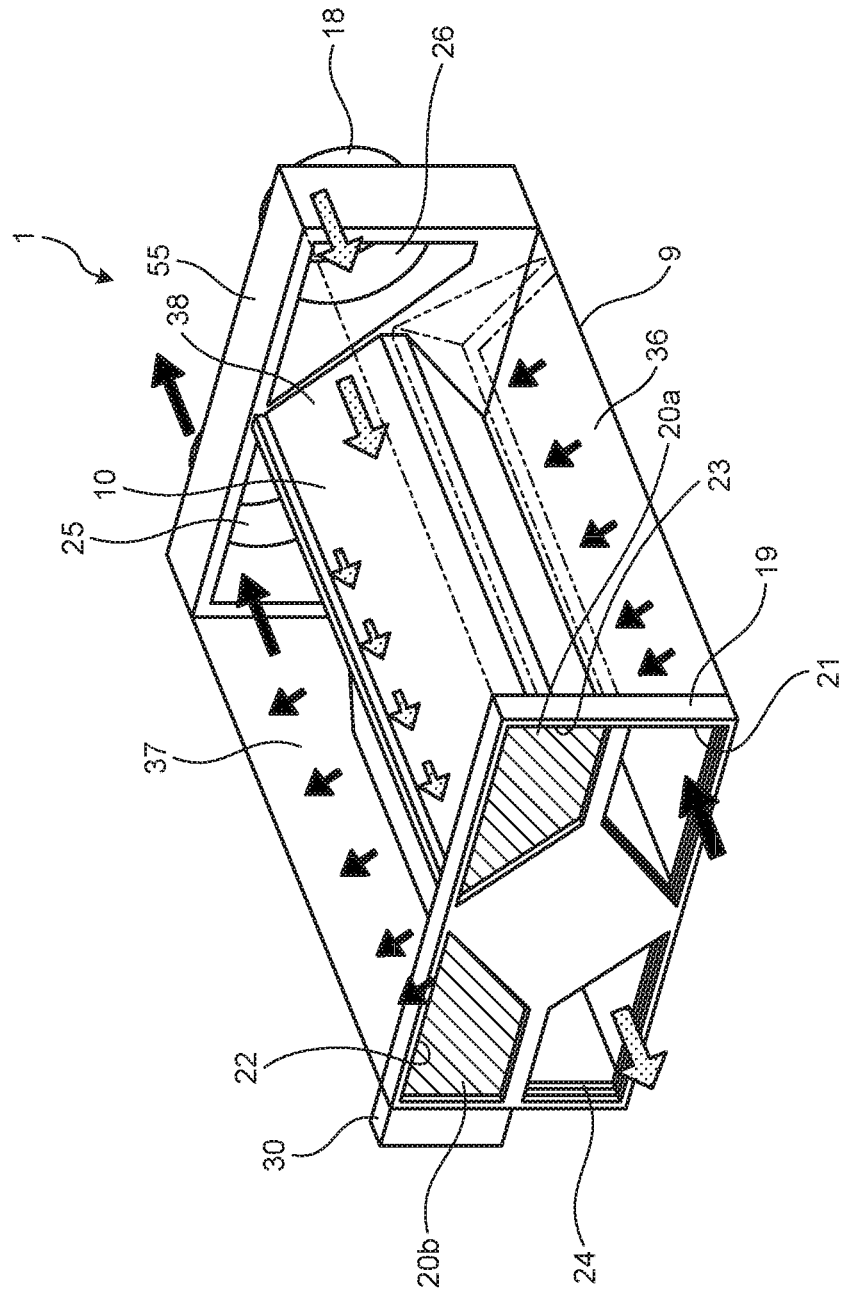
FIG. 11 is a view illustrating the state of FIG. 10 without a fan part.

FIG. 10 is a perspective view illustrating a state in which the ventilator 1 according to the first embodiment performs heat exchange ventilation. FIG. 11 is a view illustrating the state of FIG. 10 without the fan part 2. During heat exchange ventilation, the damper 20 is located at the upper position, and closes the second opening 22 and the third opening 23. When the supply fan 3 and the exhaust fan 4 are driven in the state illustrated in FIG. 10, heat exchange ventilation is performed. During heat exchange ventilation, an exhaust air flow enters the fan part 2 through the return air duct guide 16, passes through the first opening 21, and enters the exhaust air flow inlet space 36 of the heat exchanging part 9. Thereafter, the exhaust air flow passes through the heat exchanger 10 and the exhaust air flow outlet space 37, and is exhausted to the outdoor via the duct connected with the outdoor duct guide 17. The exhaust air flow passes through the exhaust filter 12 before passing through the heat exchanger 10.

In addition, during heat exchange ventilation, a supply air flow enters the supply air flow inlet space 38 of the heat exchanging part 9 via the duct connected with the outdoor duct guide 18. The supply air flow then enters the heat exchanger 10 and the supply air flow outlet space 39. Thereafter, the supply air flow enters the fan part 2 via the fourth opening 24, and is supplied into a room via the supply air duct guide 15. When the supply air flow and the exhaust air flow pass through the heat exchanger 10 as described above, heat exchange between the supply air flow and the exhaust air flow is carried out.

Figure 12:
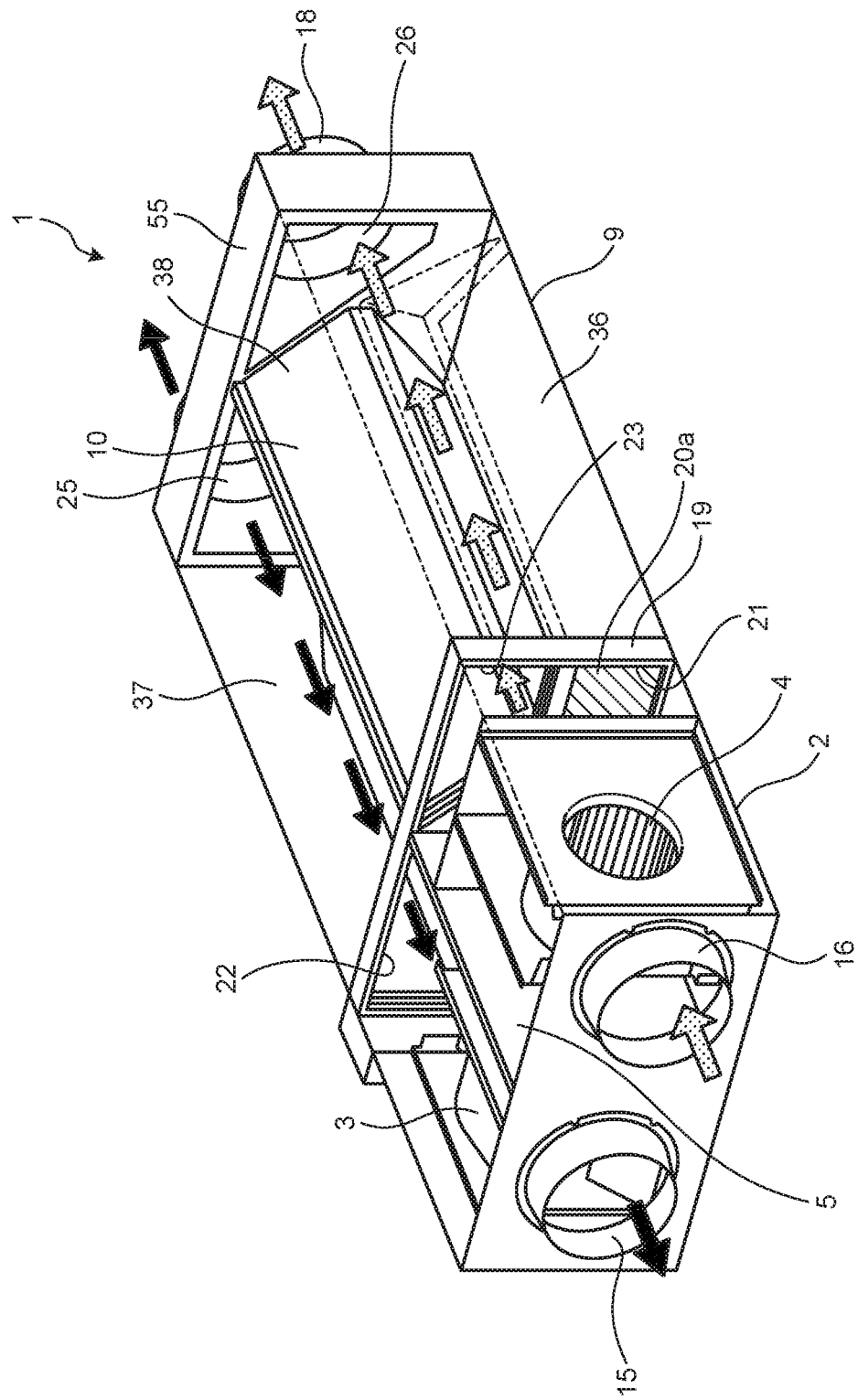
FIG. 12 is a perspective view illustrating a state in which the ventilator according to the first embodiment performs normal ventilation.
Figure 13:
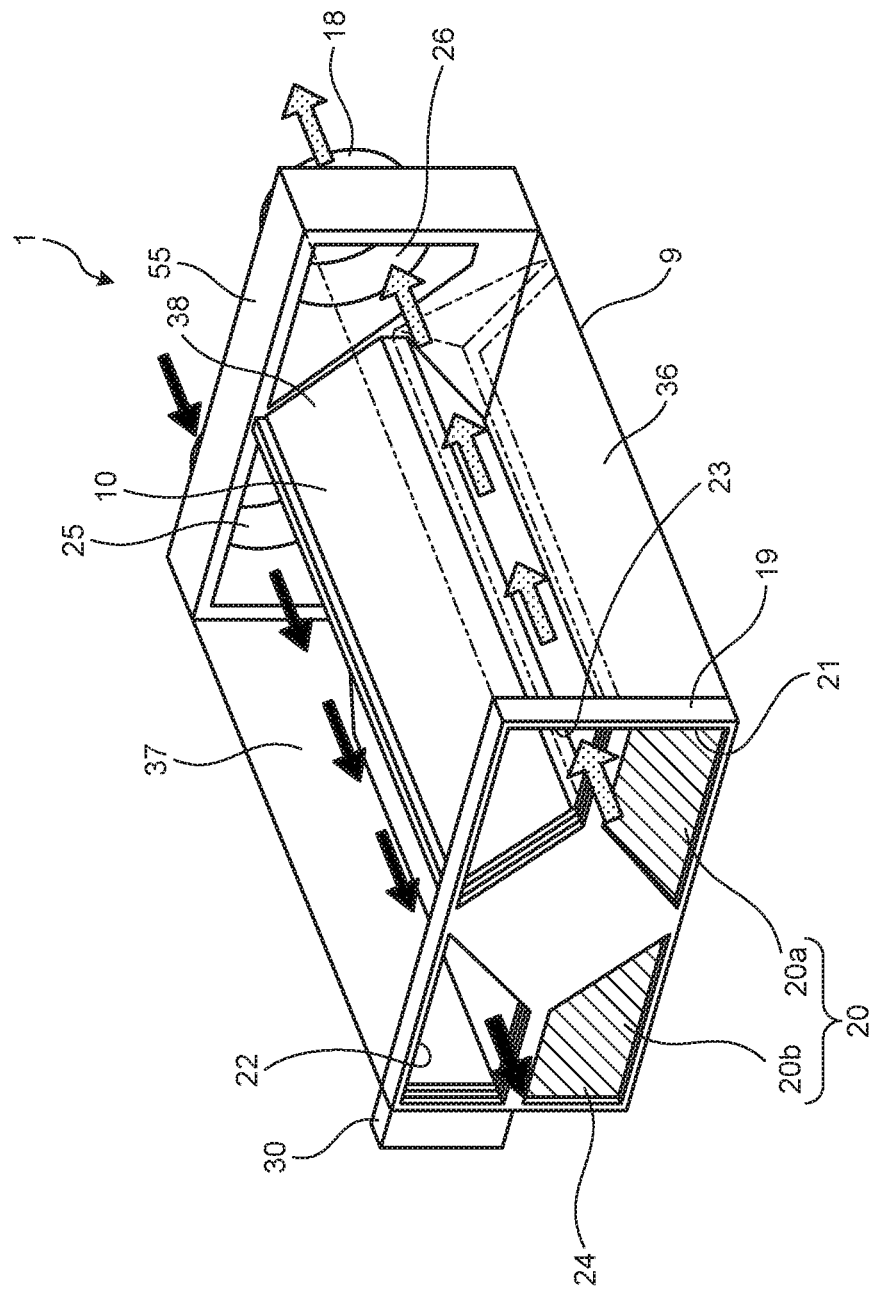
FIG. 13 is a view illustrating the state of FIG. 12 without the fan part.

FIG. 12 is a perspective view illustrating a state in which the ventilator 1 according to the first embodiment performs normal ventilation. FIG. 13 is a view illustrating the state of FIG. 12 without the fan part 2. During normal ventilation, the damper 20 is located at the lower position, and closes the first opening 21 and the fourth opening 24. When the supply fan 3 and the exhaust fan 4 are driven in the state illustrated in FIG. 12, normal ventilation is performed. During normal ventilation, an exhaust air flow enters the fan part 2 through the return air duct guide 16, passes through the third opening 23, and enters the supply air flow inlet space 38 of the heat exchanging part 9. Thereafter, the exhaust air flow is exhausted to the outdoor via the duct connected with the outdoor duct guide 18 without passing through the heat exchanger 10.

In addition, during normal ventilation, the supply air flow enters the exhaust air flow outlet space 37 of the heat exchanging part 9 via the duct connected with the outdoor duct guide 17. Thereafter, the supply air flow enters the fan part 2 via the second opening 22 without passing through the heat exchanger 10, and is supplied into the room via the supply air duct guide 15. In this process, the supply air flow passes through the filter provided over the second opening 22. When the supply air flow and the exhaust air flow do not pass through the heat exchanger 10 as described above, normal ventilation during which heat exchange between the supply air flow and the exhaust air flow is not carried out is performed.

In the first embodiment, because the exhaust air flow outlet space 37 through which the exhaust air flow passes during heat exchange ventilation serves as an air passage through which the supply air flow passes during normal ventilation, an air passage as a bypass for the supply air flow need not be additionally provided. In addition, because the supply air flow inlet space 38 through which the supply air flow passes during heat exchange ventilation serves as an air passage through which the exhaust air flow passes during normal ventilation, an air passage as a bypass for the exhaust air flow need not be additionally provided. Thus, the ventilator 1 capable of performing both normal ventilation and heat exchange ventilation while preventing increase in the size of the system can be achieved. In addition, because neither of the supply air flow and the exhaust air flow passes through the heat exchanger 10 during normal ventilation, pressure loss is reduced and noise is suppressed.

The ventilator 1 includes a control circuit 31 in a control circuit box 30. The indoor temperature detecting thermistor 27, the outdoor temperature detecting thermistor 28 for heat exchange ventilation, and the outdoor temperature detecting thermistor 29 for normal ventilation are connected with the control circuit 31, and the control circuit 31 can thus acquire temperature information of these components. The control circuit 31 has a function of selecting either normal ventilation or heat exchange ventilation on the basis of the temperature information, numerical values set in advance at the factory, or numerical values set by a user through a remote controller 32 or the like.

Figure 14:
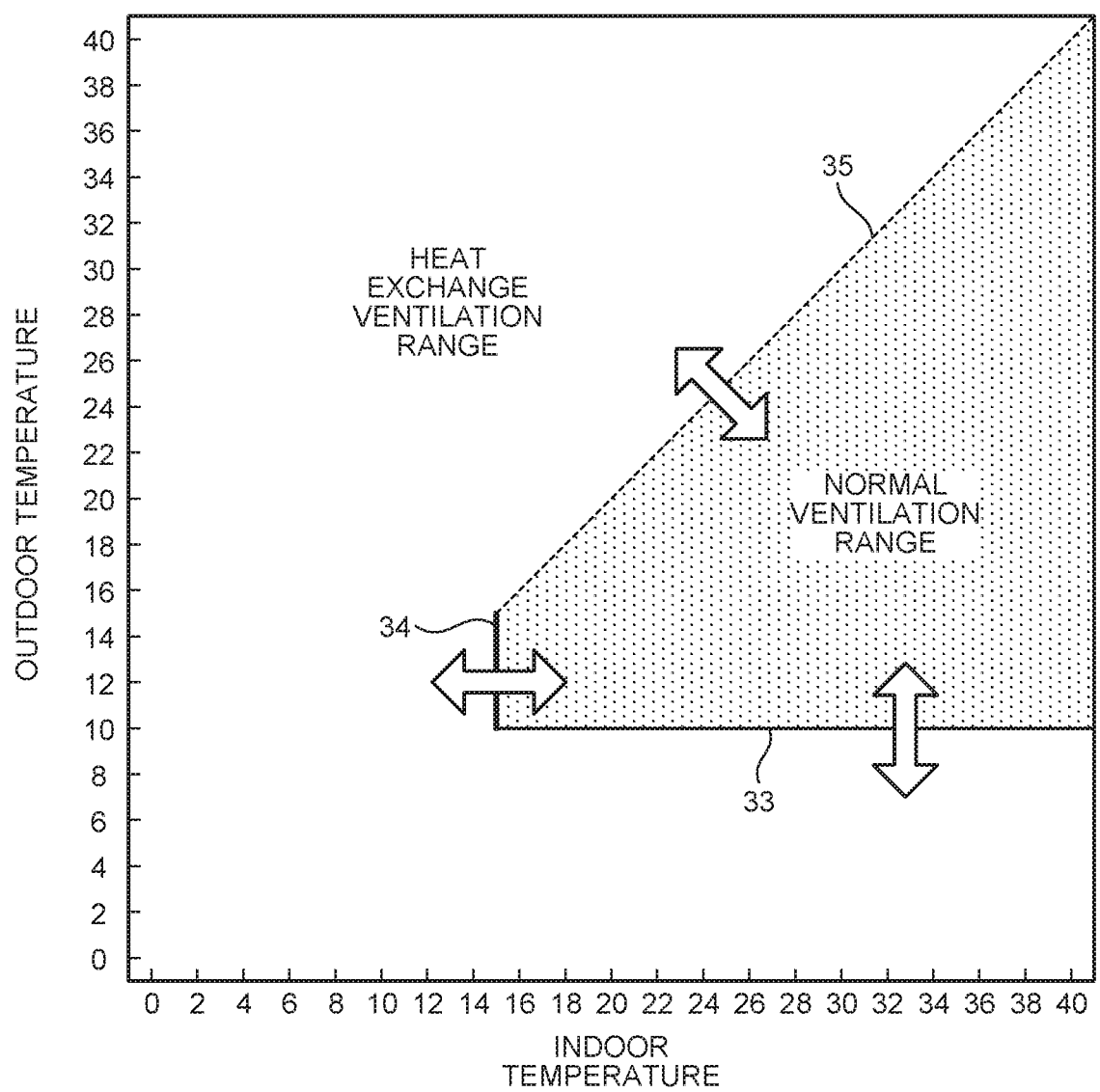
FIG. 14 is a diagram illustrating an example of a map of determination between normal ventilation and heat exchange ventilation based on indoor temperature detected by an indoor temperature detecting thermistor and outdoor temperature detected by an outdoor temperature detecting thermistor for heat exchange ventilation or an outdoor temperature detecting thermistor for normal ventilation in the ventilator according to the first embodiment.

FIG. 14 is a diagram illustrating an example of a map of determination between normal ventilation and heat exchange ventilation based on indoor temperature detected by the indoor temperature detecting thermistor 27 and outdoor temperature detected by the outdoor temperature detecting thermistor 28 for heat exchange ventilation or the outdoor temperature detecting thermistor 29 for normal ventilation in the ventilator 1 according to the first embodiment. In the determination map illustrated in FIG. 14, a minimum outdoor temperature 33 at which normal ventilation is permitted, a minimum indoor temperature 34 at a temperature equal to or higher than which normal ventilation is permitted, and an indoor/outdoor temperature difference 35 with which normal ventilation is permitted are set. No that the indoor/outdoor temperature difference 35 is obtained by subtracting outdoor temperature from indoor temperature. Normal ventilation is performed in a range surrounded by a line representing the minimum outdoor temperature 33, a line representing the minimum indoor temperature 34 and a line representing the indoor/outdoor temperature difference 35, and heat exchange ventilation is performed outside of the range. The determination on whether to perform normal ventilation or heat exchange ventilation is performed at regular time intervals. An example of the regular time intervals is about a time interval of several minutes to several tens of minutes.

Note that sirocco fans or turbo fans, which are centrifugal fans, can be used for the supply fan 3 and the exhaust fan 4, for example. In addition, the relative vertical positions of the exhaust air flow outlet space 37 and the supply air flow outlet space 39 and the relative vertical positions of the supply air flow inlet space 38 and the exhaust air flow inlet space 36 in the example described above may be reversed. Specifically, the exhaust air flow outlet space 37 may be formed below the supply air flow outlet space 39, and the supply air flow inlet space 38 may be formed below the exhaust air flow inlet space 36. In this case, the direction in which the inclined portion 14a formed on the vertical partition member 14 is reversed.

In addition, the fan part 2 may be separable from the heat exchanging part 9. For example, in a case where the space for installation of the ventilator 1 is limited, the fan part 2 and the heat exchanging part 9 may be installed separately and connected with each other by ducts.

Second Embodiment

Figure 15:
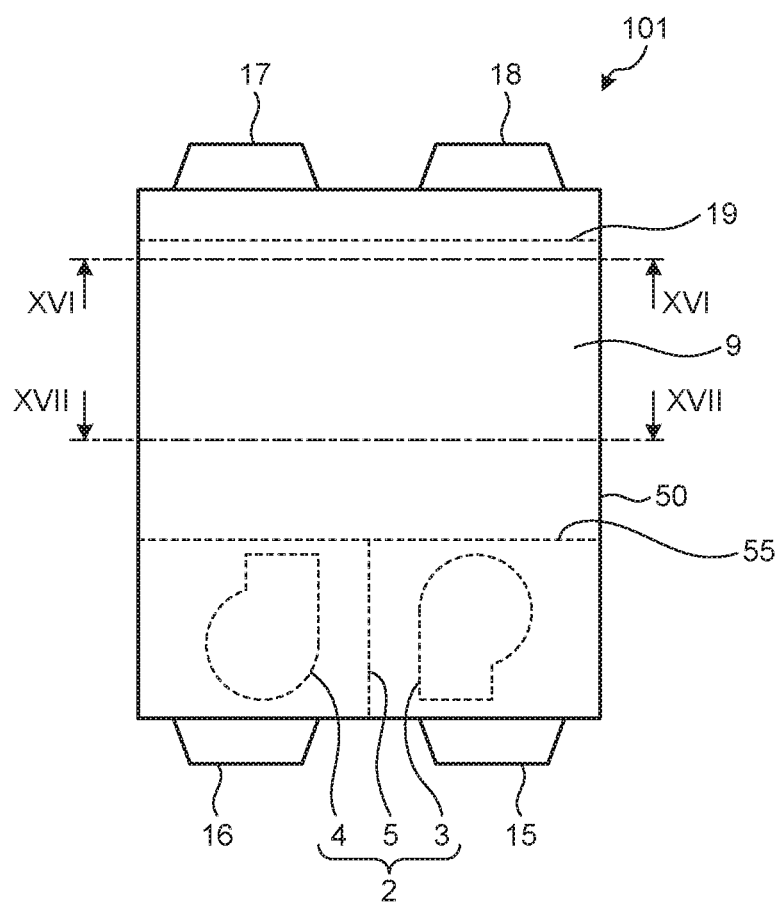
FIG. 15 is a plan view of a ventilator according to a second embodiment of the present invention.
Figure 16:
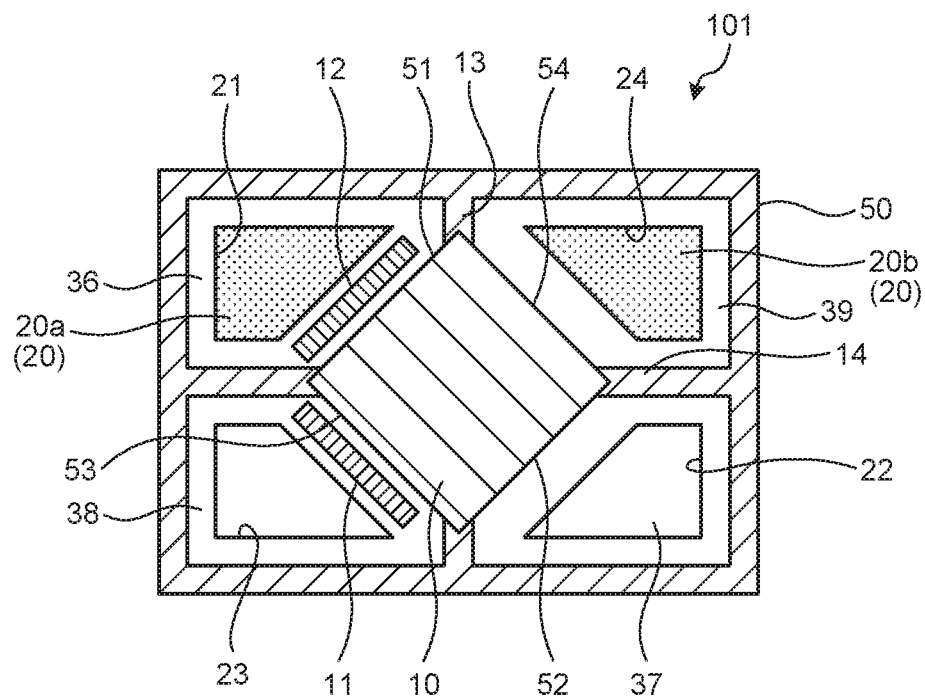
FIG. 16 is a cross-sectional view taken along line XVI-XVI illustrated in FIG. 15 as viewed in the direction of arrows.
Figure 17:
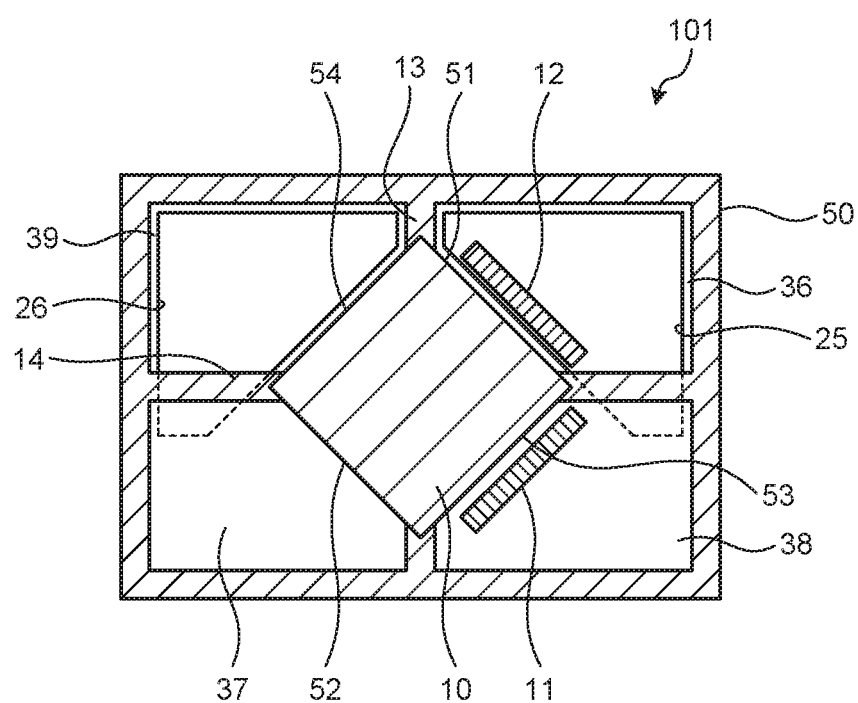
FIG. 17 is a cross-sectional view taken along line XVII-XVII illustrated in FIG. 15 as viewed in the direction of arrows.
Figure 18:
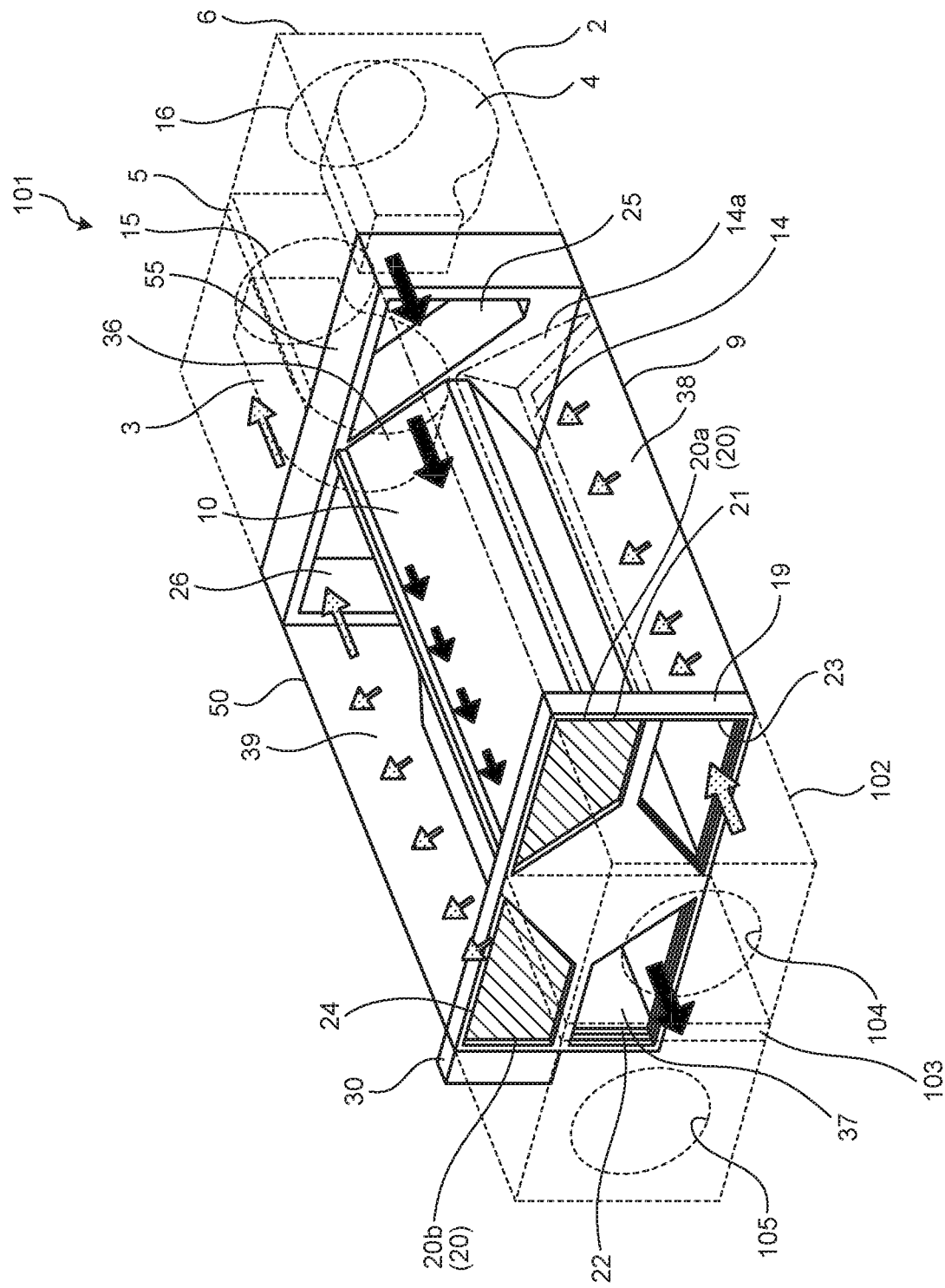
FIG. 18 is a perspective view of the ventilator according to the second embodiment.

FIG. 15 is a plan view of a ventilator according to a second embodiment of the present invention. FIG. 16 is a cross-sectional view taken along line XVI-XVI illustrated in FIG. 15 as viewed in the direction of arrows. FIG. 17 is a cross-sectional view taken along line XVII-XVII illustrated in FIG. 15 as viewed in the direction of arrows. FIG. 18 is a perspective view of the ventilator according to the second embodiment. FIG. 18 also illustrates a transparent view of an internal structure as viewed through the housing 50 of a ventilator 101. Note that components similar to the components in the first embodiment described above will be represented by the same reference numerals, and detailed description thereof will not be repeated.

While the air passage turning wall 19, which is the first end wall part, constitutes a wall on the indoor side, which is a side on which a supply air duct and a return air duct are connected, in the first embodiment described above, the air passage turning wall 19, which is the first end wall part, constitutes a wall on the outdoor side, which is a side on which an outdoor duct is connected, in the second embodiment. In addition, while the second end wall 55, which is the second end wall part, constitutes a wall on the outdoor side, which is a side on which an outdoor duct is connected, in the first embodiment described above, the second end wall 55, which is the second end wall part, constitutes a wall on the indoor side, which is a side on which a supply air duct and a return air duct are connected, in the second embodiment. Thus, in the ventilator 101 according to the second embodiment, the fan part 2 is provided on the side of the second end wall 55, which is the second end wall part. Specifically, the supply fan 3 and the exhaust fan 4 are provided on the side opposite to the heat exchanger 10 with respect to the second end wall 55. In addition, the supply fan 3, which is the second fan, sucks out air through the sixth opening 26. The exhaust fan 4, which is the first fan, sends air toward the fifth opening 25.

The fifth opening 25 communicates with the exhaust air flow outlet space 37 via the exhaust air flow inlet space 36 and the heat exchanger 10. The sixth opening 26 communicates with the supply air flow inlet space 38 via the supply air flow outlet space 39 and the heat exchanger 10.

In addition, a duct connection box 102 is provided on the side opposite to the heat exchanger 10 with respect to the air passage turning wall 19. The duct connection box 102 is a box covering the first opening 21, the second opening 22, the third opening 23, and the fourth opening 24 formed in the air passage turning wall 19. A partition wall 103 is provided inside the duct connection box 102. The partition wall 103 partitions the inside of the duct connection box 102 into a space in which the first opening 21 and the third opening 23 are formed and a space in which the second opening 22 and the fourth opening 24 are formed. This prevents air passing through the first opening 21 or the third opening 23 and air passing through the second opening 22 or the fourth opening 24 from being mixed.

The duct connection box 102 has a duct connection port 104 communicating with a space in which the first opening 21 and the third opening 23 are formed, and a duct connection port 105 communicating with a space in which the second opening 22 and the fourth opening 24 are formed. The duct connection port 104 is provided with an outdoor duct guide 17, and the duct connection port 105 is provided with an outdoor duct guide 18 (also see FIG. 15).

To sum up the schematic configuration of the ventilator 101, the fan part 2, that is, the supply fan 3 and the exhaust fan 4 are provided on the side opposite to the heat exchanger 10 with respect to the second end wall 55. In addition, the supply air duct guide 15 and the return air duct guide 16 are provided on parts of the fan part outer wall 6 facing the second end wall 55. In addition, the outdoor duct guides 17 and 18 are provided on parts of the duct connection box 102 facing the air passage turning wall 19.

In the case of such a configuration as well, heat exchange ventilation is carried out when the second opening 22 and the third opening 23 are closed by the damper 20, and normal ventilation is carried out when the first opening 21 and the fourth opening 24 are closed by the damper 20. Note that FIG. 18 illustrates a state in which the second opening 22 and the third opening 23 are closed by the damper 20 and heat exchange ventilation is carried out.

Note that sirocco fans or turbo fans, which are centrifugal fans, can be used for the supply fan 3 and the exhaust fan 4, for example. In addition, the relative vertical positions of the exhaust air flow outlet space 37 and the supply air flow outlet space 39 and the relative vertical positions of the supply air flow inlet space 38 and the exhaust air flow inlet space 36 in the example described above may be reversed. Specifically, the exhaust air flow outlet space 37 may be formed above the supply air flow outlet space 39, and the supply air flow inlet space 38 may be formed above the exhaust air flow inlet space 36. In this case, the direction in which the inclined portion 14a formed on the vertical partition member 14 is reversed.

In addition, the fan part 2 and the duct connection box 102 may be separable from the heat exchanging part 9. For example, in a case where the space for installation of the ventilator 101 is limited, the fan part 2 and the duct connection box 102 may be installed separately from the heat exchanging part 9, the fan part 2 and the heat exchanging part 9 may be connected with each other via a duct, and the duct connection box 102 and the heat exchanging part 9 may be connected with each other via a duct. In addition, the fifth opening 25 and the sixth opening 26 may be formed in a face different from the second end wall 55 among the outer faces of the housing 50. In this case as well, the fan part outer wall 6 may be formed to cover the fifth opening 25 and the sixth opening 26.

The configurations presented in the embodiments above are examples of the present invention, and can be combined with other known technologies or can be partly omitted or modified without departing from the scope of the present invention.

REFERENCE SIGNS LIST 1 ventilator; 2 fan part; 3 supply fan; 4 exhaust fan; 5 fan part air passage partition; 6 fan part outer wall; 9 heat exchanging part; 10 heat exchanger; 10a partition member; 11 supply filter; 12 exhaust filter; 13 lateral partition member; 14 vertical partition member; 14a inclined portion; 15 supply air duct guide; 16 return air duct guide; 17 outdoor duct guide; 18 outdoor duct guide; 19 air passage turning wall; 20 damper; 20a first damper; 20b second damper; 21 first opening; 22 second opening; 23 third opening; 24 fourth opening; 25 fifth opening; 26 sixth opening; 27 indoor temperature detecting thermistor; 28 outdoor temperature detecting thermistor for heat exchange ventilation; 29 outdoor temperature detecting thermistor for normal ventilation; 36 exhaust air flow inlet space; exhaust air flow outlet space; 38 supply air flow inlet space; 39 supply air flow outlet space; 50 housing; exhaust air flow inlet face; 52 exhaust air flow outlet face; 53 supply air flow inlet face; 54 supply air flow outlet face; 55 second end wall; 102 duct connection box; 103 partition wall; 104, 105 duct connection port.

The invention claimed is:

1. A ventilator comprising:
a heat exchanger including a plurality of layered partition members, and having an exhaust air flow inlet face that faces a direction perpendicular to a layering direction of the partition members and through which an exhaust air flow enters, an exhaust air flow outlet face that faces a direction perpendicular to the layering direction of the partition members and through which the exhaust air flow exits, a supply air flow inlet face that faces a direction perpendicular to the layering direction of the partition members and through which a supply air flow enters, and a supply air flow outlet face that faces a direction perpendicular to the layering direction of the partition members and through which the supply air flow exits; and
a housing accommodating the heat exchanger therein, and including a first end wall part covering a first end side of the heat exchanger along the layering direction, and a second end wall part covering a second end side of the heat exchanger along the layering direction, wherein
the inside of the housing is partitioned into an exhaust air flow inlet space to which the exhaust air flow inlet face is exposed, an exhaust air flow outlet space to which the exhaust air flow outlet face is exposed, a supply air flow inlet space to which the supply air flow inlet face is exposed, and a supply air flow outlet space to which the supply air flow outlet face is exposed,
the first end wall part has a first opening communicating with the exhaust air flow inlet space, a second opening communicating with the exhaust air flow outlet space, a third opening communicating with the supply air flow inlet space, and a fourth opening communicating with the supply air flow outlet space, and
the housing has a fifth opening communicating with the exhaust air flow outlet space, and a sixth opening communicating with the supply air flow inlet space,
the ventilator further comprising:
a first damper to selectively close either one of the first opening and the third opening; and
a second damper to selectively close either one of the second opening and the fourth opening.

2. The ventilator according to claim 1, further comprising:
a first fan to send air toward the first opening and the third opening; and
a second fan to suck out air through the second opening and the fourth opening.

3. The ventilator according to claim 2, wherein the first fan and the second fan are provided on a side opposite to the heat exchanger with respect to the first end wall part.

4. The ventilator according to claim 3, further comprising:
a fan part accommodating the first fan and the second fan therein, wherein
a duct connection part connected with a duct is provided on a portion of the fan part facing the first end wall part.

5. The ventilator according to claim 2, wherein the first fan and the second fan are provided on an indoor side of the heat exchanger along the exhaust air flow and the supply air flow.

6. The ventilator according to claim 5, further comprising:
a fan part accommodating the first fan and the second fan therein, wherein
a duct connection part connected with a duct is provided on a portion of the fan part facing the first end wall part.

7. The ventilator according to claim 1, wherein the fifth opening and the sixth opening are formed in the second end wall part.

8. The ventilator according to claim 1, further comprising:
a first fan to send air toward the fifth opening; and
a second fan to suck air through the sixth opening.

9. The ventilator according to claim 8, wherein the first fan and the second fan are provided on a side opposite to the heat exchanger with respect to the second end wall part.

10. The ventilator according to claim 9 further comprising:
a fan part accommodating the first fan and the second fan therein, wherein
a duct connection part connected with a duct is provided on a portion of the fan part facing the second end wall part.

11. The ventilator according to claim 9, wherein the fifth opening and the sixth opening are formed in the second end wall part.

12. The ventilator according to claim 8, wherein
the housing includes a duct connection box provided on a side opposite to the heat exchanger with respect to the first end wall part and covering the fifth opening and the sixth opening, and
a duct connection part connected with a duct is provided on a portion of the duct connection box facing the first end wall part.

13. The ventilator according to claim 8, wherein the first fan and the second fan are provided on an indoor side of the heat exchanger along the exhaust air flow and the supply air flow.

14. The ventilator according to claim 13 further comprising:
a fan part accommodating the first fan and the second fan therein, wherein
a duct connection part connected with a duct is provided on a portion of the fan part facing the first end wall part.

15. The ventilator according to claim 13, wherein the fifth opening and the sixth opening are formed in the second end wall part.

16. The ventilator according to claim 1, wherein the first damper and the second damper are integrated, and capable of switching between a state in which the first opening and the fourth opening are closed and a state in which the second opening and the third opening are closed.

\* \* \* \* \*